(12) United States Patent
Chen

(10) Patent No.: US 12,245,571 B1
(45) Date of Patent: Mar. 11, 2025

(54) PET HEADGEAR AND LIGHT APPARATUS

(71) Applicant: Wenlong Chen, Heyuan (CN)

(72) Inventor: Wenlong Chen, Heyuan (CN)

( * ) Notice: Subject to any disclaimer, the term of this patent is extended or adjusted under 35 U.S.C. 154(b) by 0 days.

(21) Appl. No.: 18/367,805

(22) Filed: Sep. 13, 2023

(30) Foreign Application Priority Data

Aug. 30, 2023 (CN) .......................... 202311109148.4
Aug. 30, 2023 (CN) .......................... 202322349714.0

(51) Int. Cl.
*A01K 27/00* (2006.01)
*A01K 29/00* (2006.01)
*F21L 4/00* (2006.01)
*F21V 21/084* (2006.01)

(52) U.S. Cl.
CPC ............ *A01K 29/00* (2013.01); *A01K 27/006* (2013.01); *F21L 4/00* (2013.01); *F21V 21/084* (2013.01)

(58) Field of Classification Search
CPC .................................................. A01K 27/006
See application file for complete search history.

(56) References Cited

U.S. PATENT DOCUMENTS 1,057,529 A * 4/1913 Cloninger .............. A01K 13/00
362/105

FOREIGN PATENT DOCUMENTS

WO WO-2009152681 A1 * 12/2009 ........... A01K 27/006
* cited by examiner

*Primary Examiner* — Sean P Gramling
(74) *Attorney, Agent, or Firm* — Olive Law Group, PLLC

(57) ABSTRACT

A pet headgear and light apparatus relating to the pet supplies technologies and comprising a bendable headgear part; a headgear cavity is arranged on the headgear part; fixed buckle parts are arranged on the two sides of the headgear part; vent holes are arranged on the fixed buckle parts for pet's ears piercing; an adjusting component is connected with the fixed buckle part for adjusting the headgear cavity; and a detachable mounting bracket for external electronic device is arranged on one side of the headgear part which is away from the headgear cavity. With above technical solution, it is convenient for users to wear the electronic device on the head of pets and prevent the electronic device from being obscured by the movement of pets. The bendable headgear part and the configure of adjusting component give the headgear part the advantage of being able to accommodate the different head circumferences of pets.

10 Claims, 4 Drawing Sheets

PET HEADGEAR AND LIGHT APPARATUS

FIELD OF THE INVENTION

The present utility patent relates to the pet supplies technology, and more particularly, to a pet headgear and light apparatus.

BACKGROUND OF THE INVENTION

With the improvement of people's living standards, more and more people like to keep pets, so there are more and more pet-related products, for example, a collar with lighting functions, a collar with shooting functions, a collar with lighting functions or a collar with shooting function is worn by a pet (dog or cat) and the light or shooting field of view is easily obscured when the pet lowers its head during the movement, which will affect the lighting or video recording. It is necessary to design a pet headgear device for pets to wear, so that the light apparatus or camera mounted on the pet headgear device will not be obscured by the pet itself during the movement.

DETAILED DESCRIPTION

The present utility patent aims to provide a pet headgear device for the defects and deficiencies of the prior art, which is convenient for users to wear the electronic device on the pets' head, avoiding the electronic device is obscured by the movement of pets. The bendable headgear part and the configure of adjusting component give the headgear part the advantage of being able to accommodate the different head circumferences of pets.

In order to reach the above purposes, the present utility patent adopts technical solutions as follows: a pet headgear, which is used for wearing on pets' head, comprises a bendable headgear part, wherein, a headgear cavity is arranged on the headgear part; fixed buckle parts are arranged on the two sides of the headgear part; vent holes are arranged on the fixed buckle parts for pet's ears piercing; an adjusting component is connected with the fixed buckle part for adjusting the headgear cavity; and a detachable mounting bracket for external electronic device is arranged on one side of the headgear part which is away from the headgear cavity.

Further, a threaded hole is arranged on an external electronic device, a mounting part is fixedly arranged on the headgear part, an insert slot is arranged from outside to inside of the mounting part, a guide slot which is connecting with the insert slot is arranged on the top of the mounting part, the mounting bracket comprises that a fixed base is inserted into the insert slot; one end of the fixed rod pierces through the guide slot and connects with the fixed base and is able to slide in the guide slot, a fixed backplane is arranged on the fixed rod which is away from the end of the fixing base; a fixed hole is arranged on the fixed backplane; a screw is able to pass through the fixed hole and engage with the screw hole on the external device.

Further, an adjusting component comprises two fixed strap rings on the fixed buckle part, namely, the first fixed strap ring and the second fixed strap ring; a self-adhesive fastener wherein one end is arranged on the first fixed strap ring and the other end is able to pierce through the second fixed strap ring, a section of the self-adhesive fastener which pierces through the second fixed strap ring is able to stick with the section of the self-adhesive fastener which is close to the first fixed strap ring.

Further, a pair of symmetrical openings connecting with the through vent hole are arranged on the fixed buckle part which is located on the headgear part, the headgear part comprises a fixed strap with two ends fixed to each end of the openings.

Further, the fixed base and fixed rod are arranged vertically, the headgear part is made of plastic and is in I-shape.

Optionally, a pair of symmetrical openings connecting with the through vent hole are arranged on the fixed buckle part which is located on the headgear part, the headgear part comprises a fixed strap with two ends fixed to each end of the openings.

A light apparatus, comprises a lamp body, is arranged on a pet headgear. The lamp body comprises a mounting shell, wherein, a detachable threaded hole is arranged on one end of the mounting shell to connect with the mounting bracket by screws; a hole is arranged on the end of the mounting shell which is away from the threaded hole; a lampshade wherein one part pierces through the hole and the other part is confined in the mounting shell and is able to move relative to the hole; a circuit board is arranged in the mounting shell; a lamp bead is arranged in a space enclosed by the lampshade and the circuit board and electrically connected with the circuit board; a tact switch is arranged between the open edge of the lampshade and the circuit board; batteries which are electrically connected with the circuit board are arranged in the mounting shell, the batteries are arranged at one side of the circuit board which is away from the lamp bead.

Further, a mounting shell comprises a mounting shell body with storage cavity; A hole is arranged at one end of the mounting shell body, a mounting cover, which is connected with the mounting shell body by screw thread, is arranged on the other end of the mounting shell body, a positioning block is protruded on the side of the mounting cover, which is away from the hole, the threaded hole is arranged to pass through the positioning block, the insert slot is arranged on the fixed backplane to connect with the positioning block and the fixed hole.

Further, a light apparatus comprises: a stop ring is arranged in the mounting shell body for being pierced through by the end of the lampshade which is away from the opening, stop blocks are symmetrically arranged on both sides of opening edge of the lampshade, a slide block is arranged on the stop block, a annular chute is arranged in the stop ring, the slide block is able to slide in the chute, a locking post is arranged on the side of the stop ring which is away from the lampshade, the locking connection part is arranged on the side wall of the locking post for limiting the stop block and the circuit board.

Further, an annular stop slot is arranged on the inner side of the mounting shell body, a locking block that engages with the stop slot is arranged on the end of the locking post which is away from the locking block.

Further, a sealing sleeve is arranged in the mounting shell body which is located between the hole and the stop ring, the sealing sleeve is sheathed on the lampshade.

With above technical solution, the beneficial effect of the present utility patent is: a pet headgear device comprises a headgear part, an adjusting component and a mounting bracket. A bendable headgear part; a headgear cavity is arranged on the headgear part; the headgear cavity is able to cover the head of pets, fixed buckle parts are arranged on the two sides of the headgear part; vent holes are arranged on the fixed buckle parts for pet's ears piercing; an adjusting component is connected with the fixed buckle part for adjusting the headgear cavity; a detachable mounting bracket for external electronic device is arranged on one side of the headgear part which is away from the headgear cavity. The external electronic device is a light apparatus or a camera. It is convenient for users to replace the electronic device on the pet headgear device by the means of detachable assembly of the external electronic device and mounting bracket, the setting of headgear part achieve to wear the electronic device on the head of pets and prevent the electronic device from being obscured by the movement of pets, the bendable headgear part and the configure of adjusting component give the headgear part the advantage of being able to accommodate the different head circumferences of pets.

DESCRIPTION OF THE DRAWINGS

In order to provide a clearer description of the embodiments regarding the present utility patent or the technical scheme in the prior art, below is a brief introduction to the drawings required in the embodiment or prior art description. Obviously, the drawings in the following description only relate to some embodiments of the present utility patent. For ordinary technicians in this art, other drawings can be obtained based on these ones without providing any creative labor.

DRAWING MARKS 1. headgear part; 11. fixed buckle part; a. vent hole; 2. adjusting component; 3. mounting bracket; 12. mounting part; d. insert slot; e. guide slot; 31. fixed base; 32. fixed rod; 33. fixed backplane; f. fixed hole; 21. the first fixed strap ring; 22. the second fixed strap ring; 23. self-adhesive fastener; 24. fixed strap; 4. lamp body; 41. mounting shell; g. hole; 42. lampshade; 43. circuit board; 44. lamp bead; 45. tact switch; 46. batteries; 411. mounting shell body; 412. mounting cover; 413. positioning block; 47. stop ring; 421. stop block; 422. slide block; 471. locking connection part; 472. locking block; i. stop slot; 48. sealing sleeve; 431. positive electrode; 432. negative electrode.

DETAILED DESCRIPTION OF THE PREFERRED EMBODIMENTS

Below is a further detailed description of the present utility patent based on the drawings.

The present embodiment only shows an explanation of the present utility patent and it is not a limitation to the present utility patent. Technicians in the art can make modifications to this embodiment as needed without making any creative contributions after reading this specification, which are always protected by the patent law as long as they are within the scope of the claims of the present utility patent.

Figure 1:
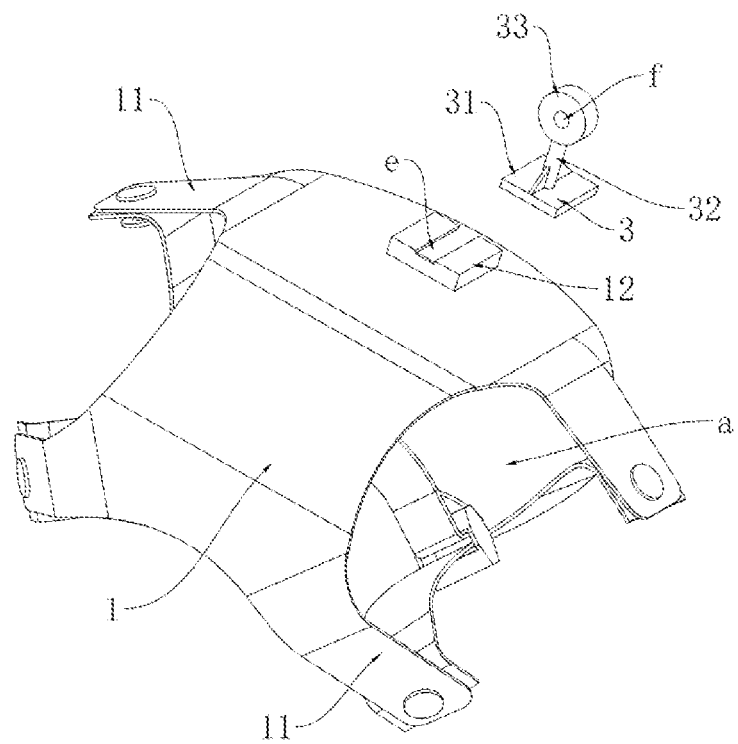
FIG. 1 is an exploded view of the pet headgear device.
Figure 2:
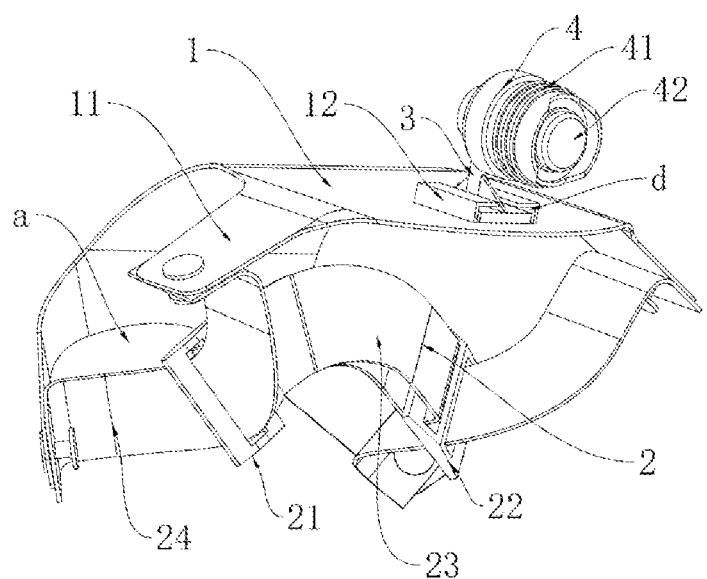
FIG. 2 is a structural view of the lamp body installed on the pet headgear device.
Figure 3:
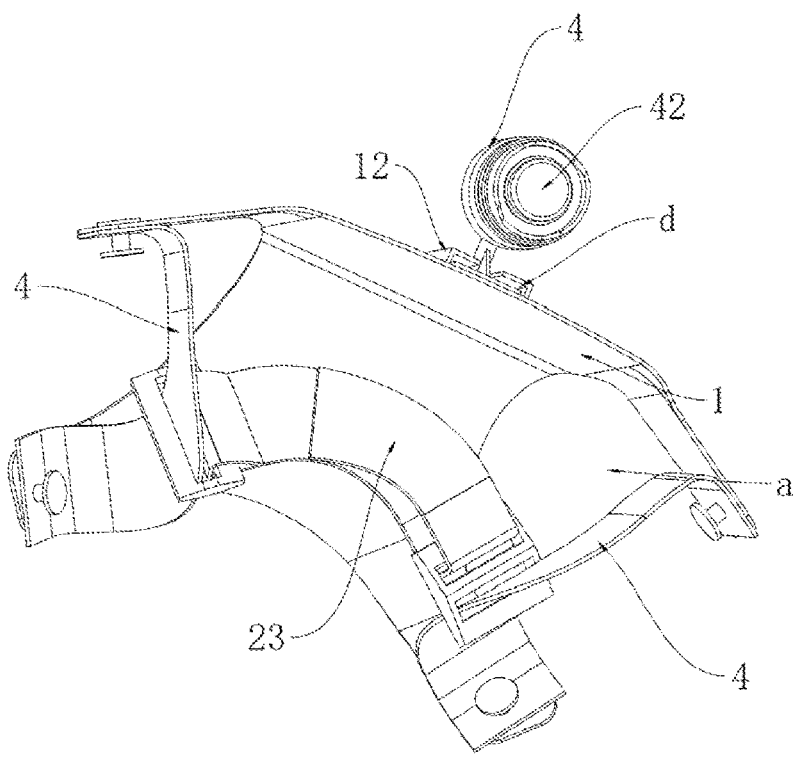
FIG. 3 is a structural view of another direction where the lamp body is installed on the pet headgear device.
Figure 4:
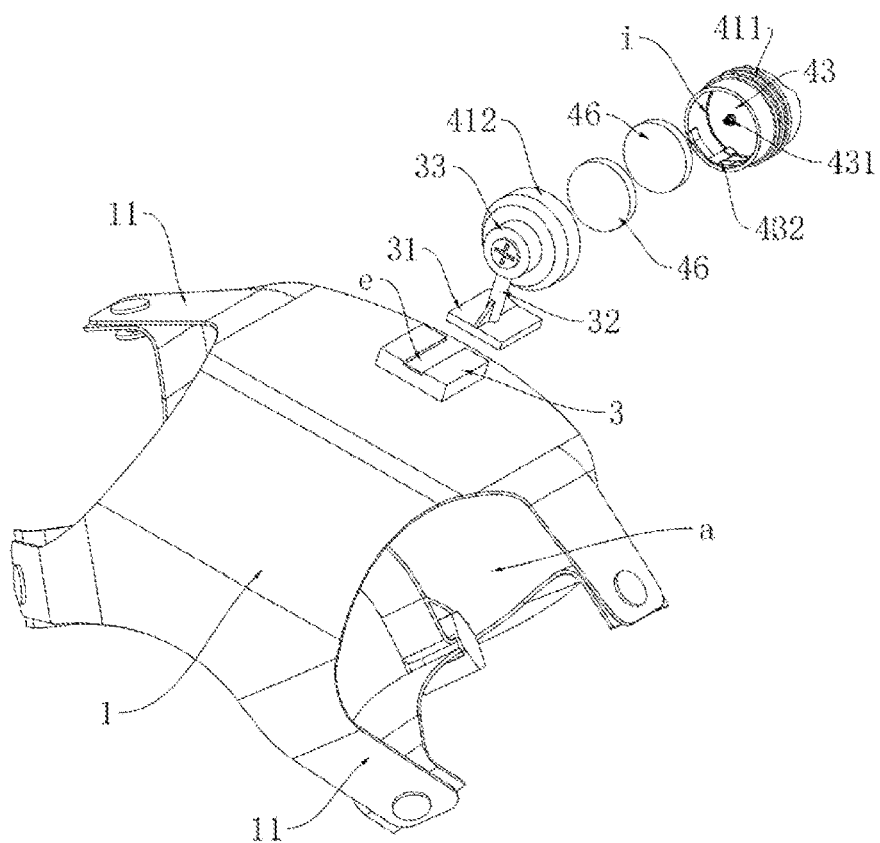
FIG. 4 is a exploded view of the lamp body installed on the pet headgear device.
Figure 5:
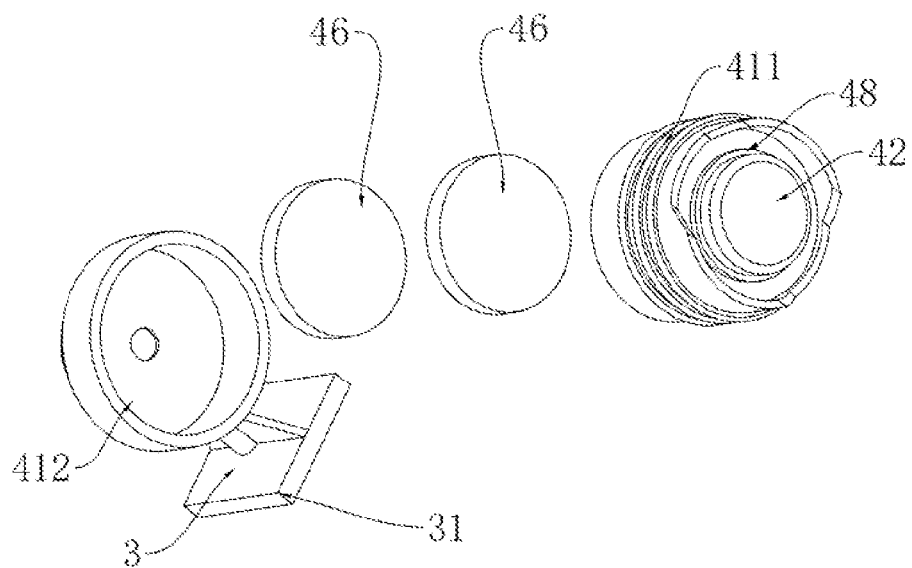
FIG. 5 is an exploded view of the lamp body.

The present embodiment relates to a pet headgear device for wearing on the head of the pets as shown in FIG. 1, comprising a headgear part 1, an adjusting component 2 and a mounting bracket 3.

A bendable headgear part 1, a headgear cavity is arranged on the headgear part 1, the headgear cavity is able to cover on the head of pets, a fixed buckle part is arranged on the headgear part 1, vent holes a are arranged on the fixed buckle part 11 for pets' ears to pierce through, ab adjusting component 2 is connected with the fixed buckle part 11 for adjusting the headgear cavity, a mounting bracket 3 is arranged on the side of the headgear part 1 which is away from the headgear cavity, a detachable external electronic device is arranged on the mounting bracket 3, the external electronic device is light apparatus or a camera.

By the means of the detachable assembly of the external electronic device and a mounting bracket 3, it is convenient for users to replace the electronic device on the pet headgear device as needed, the setting of headgear part 1 achieve to wear the electronic device on the head of pets and the wearing part enables the electronic device to be worn on the head of the pet and prevent the electronic device from being obscured by the movement of pets, the bendable headgear part 1 and the configure of adjusting component 2 give the headgear component the advantage of being able to accommodate the different head circumferences of pets.

Preferably, in order to achieve the assembly between a mounting bracket 3 and an external electronic device as shown in FIGS. 1, 4, 7, and 8, a threaded hole is arranged on the external electronic device, a mounting part 12 is fixedly arranged on the headgear part 1, a insert slot d is arranged from outside to inside of the mounting part 12, a guide slot e connecting with the insert slot d is arranged on the mounting part 12, the mounting part 12 is integrated with the headgear part 1. In the present embodiment, the mounting part 12 is fixed on the upper surface of the headgear part by hot melt glue. The mounting bracket 3 includes: a fixed base 31, a fixed rod 32 and a fixed backplane 33. The fixed base 31 is plugged into the insert slot d. A fixed rod 32 wherein one end piercing through the guide slot e is fixedly connected with the fixed base 31 and is able to slide in the guide slot e. It should be noted that the fixed backplane 33 is arranged on the fixed rod 32 wherein one end away from the fixed base 31, a fixed hole f is arranged on the fixed backplane 33, screw is able to pass through the fixed hole f to engage the screw hole on the external device. The fixed rod 32 and the fixed backplane 33 are integrally formed. The fixed base 31 and the fixed rod 32 are set at an angle, the fixed rod 32 and the fixed base 31 are injection molded, a reinforcing plate is arranged between the fixed base 31 and the fixed rod 32, the reinforcing plate is able to move in the guide slot e driven by the fixed rod 32, both of the fixed rod 32 and fixed base 31 are injection molded and fixed with the reinforcing plate, in the present embodiment, the fixed base 31 and the fixed rod 32 are vertically arranged, the fixed plate is in a right-angle shape. The headgear part is made of plastic sheet. The position thickness of the fixed backplane 33 which is arranged on the headgear 1 is greater than the thickness of the fixed buckle part 11. In other embodiment, the electronic device and the mounting bracket 3 are fixed by a 7-shaped locking slot and a locking block. A mounting part 12 is fixedly arranged on the headgear part 1, a thread hole is arranged on the mounting part 12, the mounting bracket includes a fixed rod 32 and a fixed backplane 33, one end of the fixed rod 32 engages with the threaded hole on the mounting part 12, the fixed part is arranged at another end of the fixed rod 32, the fixed hole f is arranged on the fixed backplane 33, a screw is able to pass through the fixed hole f and engage with the screw hole on the external device.

It should be noted that users can move the fixed rod 32 to separate the fixed base from the insert slot d, so that the electronic device is able to be quickly disassembled from a pet headgear device. In other word, it is simple and easy for one to replace the electronic device. One can simply replace the electronic device without taking off the headgear part 1.

Optionally, as shown in FIG. 1-4, a headgear part 1 is fit for different circumferences of pets with an adjusting component 2 comprises fixed rings and a self-adhesive fastener 23. There are two fixed strap rings, namely, the first fixed strap ring and the second fixed strap ring, the two fixed strap rings are respectively arranged on a fixed buckle part 11. The fixed rings are set on the fixed buckle part 11 and are able to move relative to the fixed buckle part 11, the fixed rings can be rectangular, circular, oval or θ-shape. A self-adhesive fastener wherein one end is arranged on the first fixed strap ring 21 and the other end is able to pierce through the second fixed strap ring 22, a section of the self-adhesive fastener 23 which pierces through the second fixed strap ring 22 is able to stick with the section of the self-adhesive fastener 23 which is close to the first fixed strap ring 21. The self-adhesive fastener 23 comprises a hook surface strap and a loop surface strap, one end of the hook surface tape and one end of the loop surface tape are overlapped and sewed or fixed by heat pressure welding. The surface of the hook surface strap and the surface of the loop surface strap are arranged on the same side, one end of the loop surface strap which is away from the hook surface strap pierces through the first fixed strap ring 21, and then is bent and overlapped to be fixed by the means of sewing or heat pressure welding.

Optionally, the openings connecting with vent holes are arranged symmetrically on a fixed buckle part 11 which is on a headgear part 1, the headgear part 1 also comprises fixed straps with two ends respectively fixedly connected to the each end of the openings, the vent hole a is surrounded by the fixed straps 24 and the fixed buckle part 11. The fixed straps are nylon webbing. The ends of the fixed straps and the openings of the fixed buckle part 11 are fixed by double-sided rivets. In the present embodiment, the headgear part 1 is made of plastic as I-shape.

A light apparatus as shown in FIG. 2-8 comprises a lamp body 4, the light apparatus also comprises a pet headgear device, the lamp body 4 comprises: a mounting shell 41, a circuit board 43, a lampshade 42, a lamp bead 44, a tact switch 45 and batteries 46.

A detachable threaded hole which connected with a mounting bracket 3 by screws is arranged on the mounting shell 41, a hole g is arranged on the end of the mounting shell 41 which is away from the threaded hole. A lampshade 42 wherein one part pierces through the hole g, and the other part is limited in the mounting shell 41 and is able to move relative to the hole g. In the present embodiment, the lampshade is made of transparent material. A circuit board 43 is arranged in the mounting shell 41. A lamp bead 44 is arranged in the space surrounded by the lampshade 42 and the circuit board 43 and is electrically connected with the circuit board 43. A tact switch 45 is arranged on the circuit board 43 and electrically connected with the circuit board 43, the tact switch 45 is located between the opening edge of the lampshade 42 and the circuit board 43, the end face of the top of the tact switch 45 is in contact with the opening edge of the lampshade 42, which is used for providing restoring force for the lampshade 42. Batteries are arranged in the mounting shell 41 and electrically connected with the circuit board 43, batteries are arranged on the side of the circuit board 43 which is away from the lamp bead 44, the lamp bead 44 is an LED lamp bead 44 or a SMD lamp bead 44. In the present embodiment, the lamp bead 44 is an LED lamp bead 44, the LED lamp bead 44 is welded on the circuit board 43 and arranged in the lampshade 42. The tact switch 45 is a metal dome switch. Users can touch off the tact switch 45 by pressing the lampshade 42, and the tact switch 45 controls the lamp bead 44 to turn on or off by the circuit board 43. A positive electrode 431 and a negative electrode 432 which are connecting with the circuit board 43 are arranged on the side of the circuit board 43 which is away from the lamp bead 44, the positive electrode 431 is in a spiral shape, the negative electrode 432 is a conductive shrapnel. The batteries 46 are button cells 46.

It should be noted that the lamp body 4 is installed on a pet headgear device through a headgear part 1 and a mounting bracket 3. When one goes out with pets or walks the dog at night, he or she does not need to hold another electric light anymore if the pet wears this headgear device with the lamp body 4 installed. The light apparatus on the pets' head is able to illuminate for both pet owner and pets.

Optionally, in order to achieve the installation of a lamp body 4 and a fixed buckle part 33 which is on a mounting bracket 3 as shown in FIG. 5-8, a mounting shell 41 comprises a mounting shell body 411 and a mounting cover 412. a storage cavity is arranged in the mounting shell body 411, both of an LED lamp bead 44 and a circuit board 43 are arranged in the storage cavity. A hole g is arranged at one end of the mounting shell body 411. The mounting cover 412 is arranged on another end of the mounting shell body 411 and connected with the mounting shell body 411 by threads, a positioning block 413 is protruded on the side of the mounting cover 412 which is away from the hole g, a thread hole is arranged through the positioning block 413, an insert slot which inserting into the positioning block 413 and connecting with a fixed hole f is arranged on the fixed buckle part 33.

Figure 6:
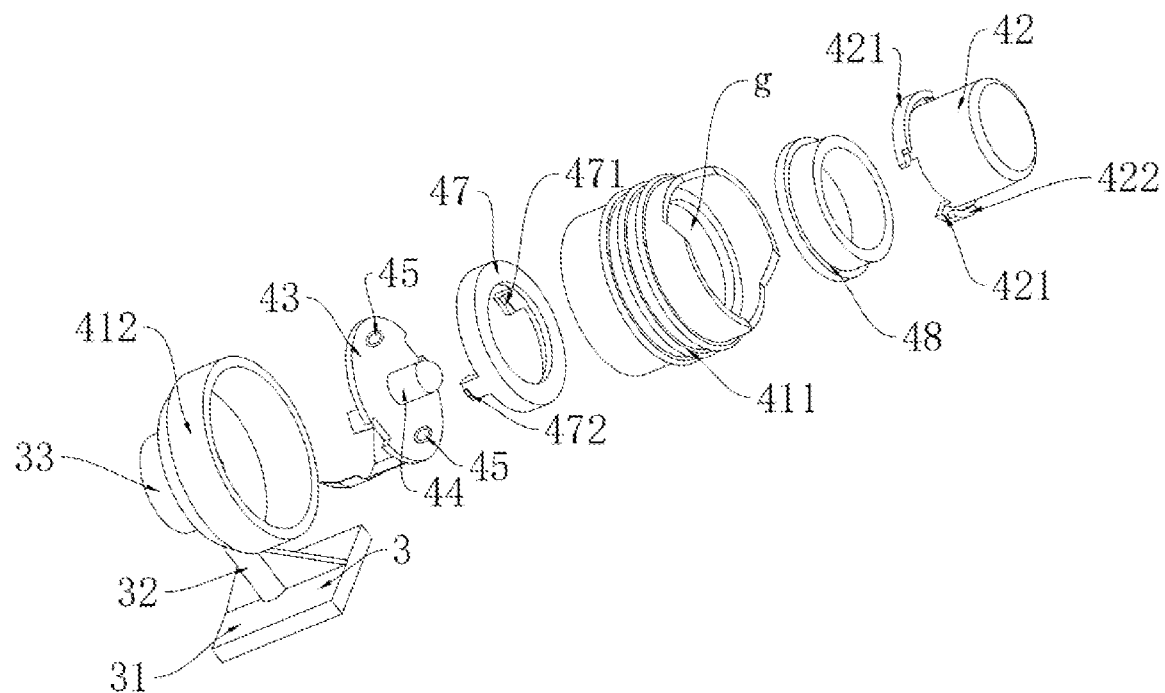
FIG. 6 is another exploded view of the lamp body.
Figure 7:
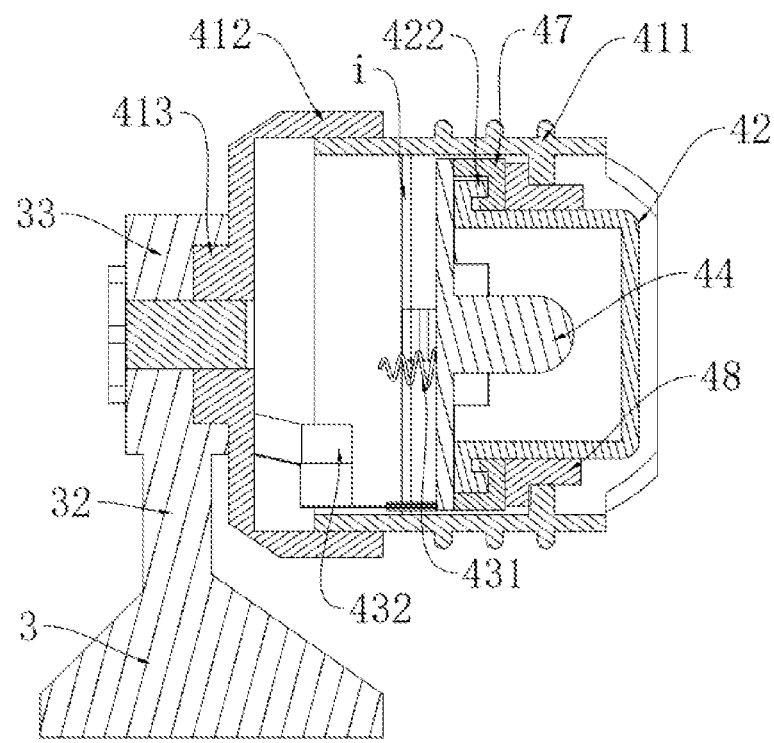
FIG. 7 is a cross-sectional view of the lamp body.
Figure 8:
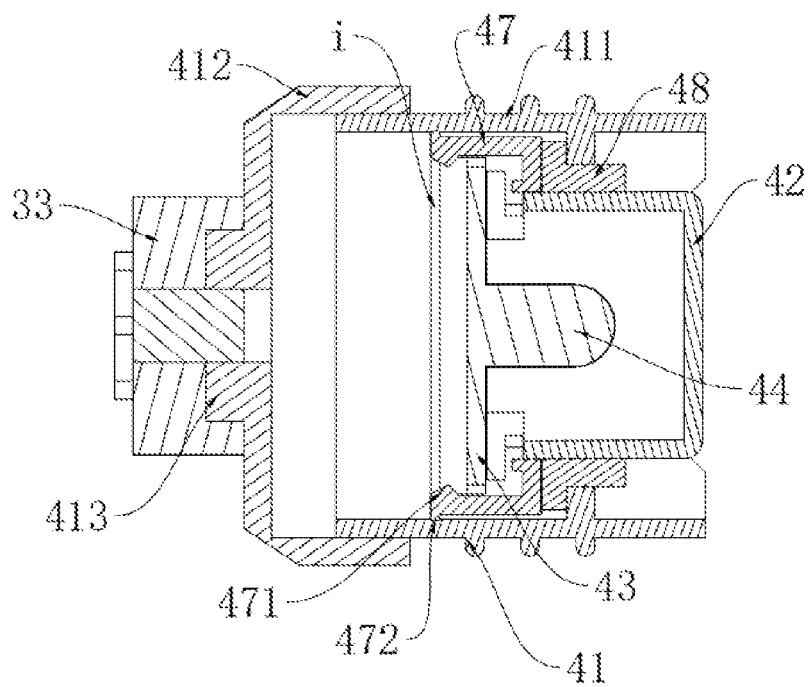
FIG. 8 is another exploded view of the lamp body.

Optionally, as shown in FIG. 6-8, a light apparatus comprises a stop ring 47. The stop ring 47 is arranged in the mounting shell body 411 to be pierced by one end of a lampshade 42 which is away from the openings, stop blocks 421 are symmetrically arranged on both sides of the opening edge of the lampshade 42, the outer diameter of the stop ring 47 is larger than the diameter of the hole g, the lampshade 42 pierces through the inner hole of the stop ring 47, the distance between the stop block 421 is greater than the length of the inner diameter of the stop ring 47, a slide block 422 is arranged on the stop block 421, an annular chute is arranged in the stop ring 47, the slide block is able to slide in the chute, a locking post is arranged on the side of the stop ring 47 which is away from the lampshade 42, a locking connection part 471 is arranged on the side wall of the locking post for limiting the stop block 421 and a circuit board 43, the distance between the locking connection part 471 and the bottom surface of the stop ring 47 is slightly larger than the sum of the thickness of the stop block 421 and the circuit board 43, so that the circuit board 43 is prevented from being separated from the stop ring 47 driven by the lampshade 42 and cannot be reset when users press the lampshade 42.

Optionally, as shown in FIGS. 6 and 8, in order to make a stop ring 47 stably installed in the mounting shell body 411, prevent the stop ring 47 from shaking along the axial direction of the mounting shell body 411, an annular stop slot i is arranged on the inner side wall of the mounting shell body 411, the locking block 472 which locking with the stop slot i is arranged on the side of the end of the locking post which is away from a locking block 471. Optionally, a positioning hole is arranged on a circuit board 43, a positioning post which is able to insert into the positioning hole is arranged on the end face of the stop ring 47.

Optionally, as shown in FIG. 6-8, in a mounting shell body 411, a sealing sleeve 48 is arranged between a stop ring 47 and a hole g, the sealing sleeve is sheathed on a lampshade 42 to avoid that the liquid from the space between the lampshade 42 and the hole g enters the mounting shell body 411, a sealing ring is sheathed on the mounting shell body 411, the sealing ring is arranged between the mounting cover 412 and the mounting shell body 411, which facilitates the installation of the lamp body 4 and avoids the liquid from the opening of the mounting shell body 411 entering the interior at the same time. The sealing sleeve 48 is made of silicone or rubber.

In some embodiments, users can install a camera on a pet headgear device via mounting bracket 3 inserted into slot d. The camera records a pet's surroundings. In the present embodiment, the camera comprises a shell and a camera body which is arranged in the shell, a threaded hole is arranged on the end of the shell which is away from the shooting area.

The above only aims to illustrate the technical solution of the present utility patent without limitation. Any other modifications or equivalent replacements of the technical solution of the present utility patent made by ordinary skilled men in the art should be included in the scope of the claims of the present utility patent as long as they do not deviate from the technical solution spirit and scope of the present utility patent.

The invention claimed is:

1. A pet headgear, comprises a bendable headgear part, wherein a headgear cavity is arranged on the headgear part; fixed buckle parts are arranged on the two sides of the headgear part; vent holes are arranged on the fixed buckle parts for pet's ears piercing; an adjusting component is connected with the fixed buckle part for adjusting the headgear cavity; detachable mounting bracket for external electronic device is arranged on one side of the headgear part which is away from the headgear cavity; a mounting part is fixedly arranged on the headgear part; an insert slot is arranged from outside to inside of the mounting part; a guide slot which is connecting with the insert slot is arranged on the top of the mounting part; the mounting bracket comprises a fixed base that is inserted into the insert slot; one end of the fixed rod pierces through the guide slot and connects with the fixed base and is able to slide in the guide slot; a fixed backplane is arranged on a fixed rod which is away from the end of the fixing base; a fixed hole is arranged on the fixed backplane; a screw is able to pass through the fixed hole and engage with a screw hole on the external device.

2. A pet headgear according to claim 1, wherein the adjusting component comprises two fixed strap rings which are arranged on the fixed buckle part, namely, the first fixed strap ring and the second fixed strap ring; a self-adhesive fastener wherein one end is arranged on the first fixed strap ring and the other end is able to pierce through the second fixed strap ring; a section of the self-adhesive fastener which pierces through the second fixed strap ring is able to stick with a section which is close to the fixed strap ring.

3. A pet headgear according to claim 2, wherein a pair of symmetrical openings connecting with the vent holes are arranged on the fixed buckle part; the headgear part comprises a fixed strap wherein the two ends are fixedly connected with each end of the openings.

4. A pet headgear according to claim 3, wherein the fixed base and the fixed rod are arranged vertically; the headgear part is made of plastic and is in I-shape.

5. A pet headgear according to claim 1, wherein a pair of symmetrical openings connecting with the vent holes are arranged on the fixed buckle part; the headgear part comprises a fixed strap wherein the two ends are fixedly connected with each end of the openings.

6. A light apparatus comprises a lamp body, wherein the light apparatus is arranged on the pet headgear as described in claim 1; the lamp body comprises: a mounting shell, wherein a detachable threaded hole is arranged on one end of the mounting shell to connect with a mounting bracket by screws; a hole is arranged on the end of the mounting shell which is away from the threaded hole; a lampshade wherein one part pierces through the hole and the other part is confined in the mounting shell and is able to move relative to the hole; a circuit board is arranged in the mounting shell; a lamp bead is arranged in a space enclosed by a lampshade and a circuit board and electrically connected with the circuit board; a tact switch is arranged between the open edge of the lampshade and the circuit board; batteries which are electrically connected with the circuit board are arranged in the mounting shell, the batteries are arranged at one side of the circuit board which is away from the lamp bead.

7. A light apparatus according to claim 6, wherein the mounting shell comprises a mounting shell body with storage cavity; the hole is arranged at one end of the mounting shell body; and a mounting cover, which is connected with the mounting shell body by screw thread, is arranged on the other end of the mounting shell body, a positioning block is protruded on the side of the mounting cover, which is away from the hole, the threaded hole is arranged to pass through the positioning block, a insert slot is arranged on the fixed backplane to connect with the positioning block and the fixed hole.

8. A light apparatus according to claim 7, wherein the light apparatus comprises a stop ring, which is arranged in the mounting shell body, used to be pierced through by the end of the lampshade, a stop block is symmetrically arranged on both sides of opening edge of the lampshade, and a slide block is arranged on the stop block, a annular chute is arranged on the stop ring, the slide block is able to slide in the chute, a locking post is arranged on the side of the stop ring which is away from the lampshade, a locking connection part is arranged on the side wall of the locking post for limiting the stop block and the circuit board.

9. A light apparatus according to claim 8, wherein an annular stop slot is arranged on the inner side of the mounting shell body, a locking block that engages with a stop slot is arranged on the end of the locking connection part which is away from the locking post.

10. A light apparatus according to claim 8, wherein a sealing sleeve is arranged in the mounting shell body which is located between the hole and the stop ring, the sealing sleeve is sheathed on the lampshade.

* * * * *